United States Patent Office 2,791,256
Patented May 7, 1957

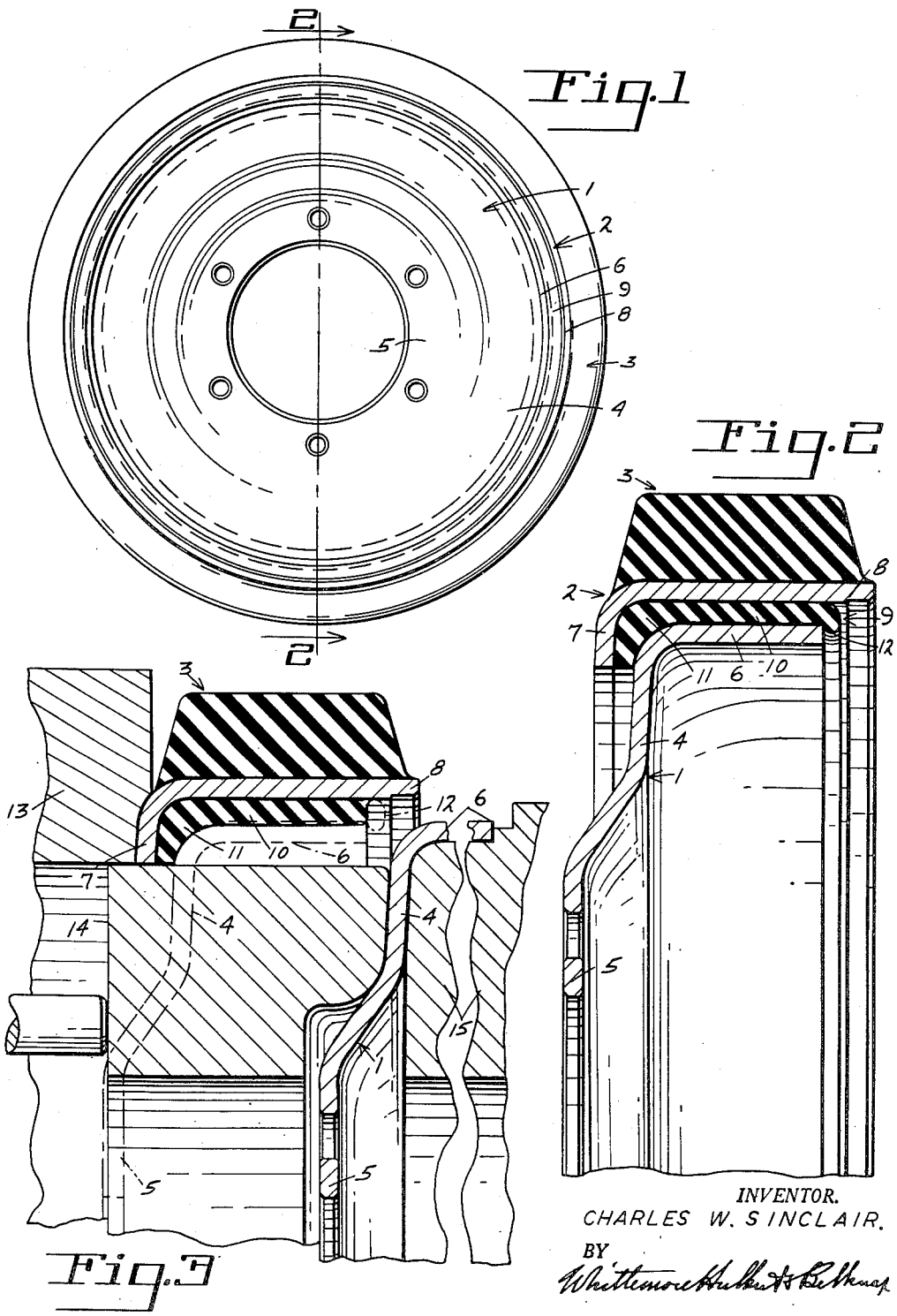

2,791,256

WHEEL AND METHOD OF MAKING THE SAME

Charles W. Sinclair, Detroit, Mich., assignor to Kelsey-Hayes Company, a corporation of Delaware Application November 16, 1953, Serial No. 392,349

2 Claims. (Cl. 152—47)

This invention relates to wheels and refers more particularly to wheels for use with flexible tracks in crawler-type tractors.

The invention has for one of its objects to provide an improved wheel employing sound deadening material between the rim and wheel body.

The invention has for another object to so construct the wheel that the sound deadening material holds the rim and wheel body in assembled relation.

The invention has for a further object to provide an improved method of making the wheel to simplify its assembly and reduce its cost.

These and other objects of the invention will become apparent from the following description taken into connection with the accompanying drawings in which—

Figure 1 is a side elevation of a wheel embodying the invention;

Figure 2 is a cross-section on the line 2—2 of Figure 1;

Figure 3 is a sectional view showing the method of assembling the rim and wheel body.

The present wheel is designed particularly for use with flexible tracks in crawler-type tractors, and in the present instance, is one of a number of bogie wheels for supporting the weight of a tractor on a track. This wheel has the wheel body 1, the rim 2, and the tread member 3. The wheel body has the web 4 formed with a central bolting-on portion 5 and the peripheral axially extending annular flange 6. The rim has the web 7 extending at one side of and spaced from the web 4 and the peripheral axially extending annular flange 8 encircling and spaced from the flange 6 in concentric relation therewith. The tread member 3 encircles and is permanently secured to the flange 8, the tread member being formed of material, such as rubber, and being vulcanized to the flange.

To deaden the sound and hold the rim body in assembled relation, there is the ring 9 located between the rim and wheel body. The ring has the axially extending body 10 between the flanges 6 and 8, the radial flange 11 between the webs 4 and 7 and the radially inwardly extending annular lip 12 along the free end of the flange 6. The ring is formed of material which is inherently resilient and adapted to be displaced during the assembly of the wheel body and rim, the material preferably being rubber. The ring is permanently secured to the rim preferably by vulcanizing the body 10 to the flange 8. The annular lip 12 results from displacing the material forming the body of the ring toward and beyond the free end of the flange 6 of the wheel body during the assembly of the wheel body and rim and from the inherent resiliency of the material.

In the manufacture of the wheel, the wheel body and rim are formed in the usual manner and the tread member 3 and ring 9 are vulcanized to the rim. The radial thickness and volume of the body 10 of the ring before the wheel body is assembled with the rim is greater than the radial distance and volume between the flanges of the wheel body and rim after they have been assembled.

During the assembly, the stationary outer die 13 supports the rim and the axially movable inner die 14 and plunger 15 support the wheel body concentric with the rim. The inner die slidably extends through the web 7 of the rim and prevents the material of the flange 11 of the ring from moving radially inwardly during the relative axial inward movement of the wheel body by the plunger. As a result, during the axial inward movement of the wheel body, the material of the flange 11 is held from moving radially inwardly of the web 7 by the inner die 14, and the material of the body 10 is reduced in thickness and displaced in an axially outward direction toward and beyond the free end of the flange 6, the inherent resiliency of the material causing the radially inward movement of the displaced material and forming the lip 12.

From the above description, it will be seen that I have provided a simple construction of bogie wheel in which the material between the wheel body and rim serves both to deaden the sound and to also hold the wheel body and rim in assembled relation both by friction between the body of the ring and the peripheral flange of the wheel body and by the displaced material of the body of the ring forming a lip extending along the free end of the flange. It will also be seen that I have provided a simple economical method of making and assembling the bogie wheel.

What I claim as my invention is:

1. A wheel comprising a wheel body having a generally radially extending web and a peripheral flange extending generally axially from the radially outer extremity of said web beyond one side thereof, a rim having a generally radially extending web extending at the opposite side of and spaced from said first-mentioned web in overlying relationship therewith and a peripheral flange extending generally axially from the radially outer extremity of said second-mentioned web and encircling and spaced from said first-mentioned flange, the free end of said second-mentioned flange extending beyond the free end of said first-mentioned flange, a tread member encircling and secured to said second-mentioned flange, and a ring of resilient sound deadening material having a portion thereof between said webs and another portion thereof between flanges, said second-mentioned portion of said ring being permanently secured to said second-mentioned flange, said second-mentioned portion of said ring between said flanges being radially compressed between said flanges into tight frictional contact with said first-mentioned flange and being displaced toward and beyond the free end of said first-mentioned flange and radially inwardly along the free end of said first-mentioned flange to provide a retaining lip for the latter, the sole means for retaining said wheel body and rim against relative axial shifting movement consisting of said webs and sad first-mentoned portion of said ring, said second-mentioned portion of said ring secured to said second-mentioned flange and frictionally contacting said first-mentioned flange and said retaining lip.

2. The method of making a wheel having a wheel body formed with a generally radially extending web and a peripheral flange extending generally axially from the radially outer extremity of said web beyond one side thereof, a rim formed with a generally radially extending annular web extending at the opposite side of and spaced from the first-mentioned web in overlying relationship therewith and a peripheral flange extending generally axially from the radially outer extremity of said second-mentioned web and encircling the first-mentioned flange, and a ring of resilient sound deadening material between the body and rim with a portion of the ring between the webs and another portion of the ring radially compressed between the flanges, comprising the steps of placing the ring within the rim with the first-mentioned portion contacting the second-mentioned web and the second-mentioned portion contacting the second-mentioned flange, securing the second-mentioned portion of the ring to the second-mentioned flange, forcing the wheel body within the ring in an axial direction to compress the second-mentioned portion of the ring between the flanges, and at the same time confining the first-mentioned portion of the ring between the webs and blocking displacement of the first-mentioned portion of the ring in a radially inward direction beyond the radially inner edge of the second-mentioned web and displacing the second-mentioned portion of the ring between the flanges axially in a direction opposite to the direction of forcing of the wheel body to extend the second-mentioned portion of the ring beyond and radially inwardly along the free end of the first-mentioned flange.

References Cited in the file of this patent

UNITED STATES PATENTS

| Number | Name | Date |
|---|---|---|
| 52,089 | Straub | Jan. 16, 1866 |
| 1,693,576 | Hale | Nov. 27, 1928 |
| 1,940,885 | Rosenberg | Dec. 26, 1933 |
| 2,016,828 | Brownyer | Oct. 8, 1935 |
| 2,138,946 | Trickey | Dec. 6, 1938 |
| 2,346,574 | Guy | Apr. 11, 1944 |
| 2,519,927 | Pedu | Aug. 22, 1950 |
| 2,609,856 | Paton | Sept. 9, 1952 |